United States Patent [19]

Miller

[11] Patent Number: 4,669,999
[45] Date of Patent: Jun. 2, 1987

[54] LUBRICANT DELIVERING AND CONTAINMENT OVERLOAD SHEARABLE COUPLING

[75] Inventor: E. Kent Miller, Rockford, Ill.

[73] Assignee: Sundstrand Corporation, Rockford, Ill.

[21] Appl. No.: 642,987

[22] Filed: Aug. 22, 1984

[51] Int. Cl.$^4$ .......................... F16N 7/36; F16D 9/00
[52] U.S. Cl. .................................... 464/10; 137/68.1; 184/6.4; 403/2; 464/32
[58] Field of Search ................. 137/68 R, 797; 403/2, 403/DIG. 3; 464/7, 10, 16, 30, 32, 33, 97, 155, 156, 158, 179, 183; 184/6.4, 6.11, 6.12, 107

[56] References Cited

U.S. PATENT DOCUMENTS

| | | | |
|---|---|---|---|
| 3,050,939 | 8/1962 | Morley | 137/68 R X |
| 3,200,616 | 8/1965 | Hawkins | 464/33 |
| 3,637,049 | 1/1972 | Butterfield et al. | 184/6.12 |
| 3,889,489 | 6/1975 | Casey et al. | 464/16 |
| 3,963,055 | 6/1976 | DeRosa | 138/140 |
| 3,982,408 | 9/1976 | Wright | 464/32 |
| 4,361,165 | 11/1982 | Flory | 137/68 R X |

*Primary Examiner*—Stuart S. Levy
*Assistant Examiner*—Daniel P. Stodola

*Attorney, Agent, or Firm*—Harold A. Williamson; Ted E. Killingsworth; James A. Wanner

[57] ABSTRACT

A lubricant delivering coupling adapted to interconnect a power transfer unit and a load having a rotary input. The coupling is comprised of a pair of concentrically disposed inner and outer hollow members. The outer member is in a torque transmitting relationship between the power transfer unit and the load. The inner hollow member is secured at both ends to an inner surface of the outer member and is adapted to receive lubricant from a lubricant source within the transfer device for delivery to and through the hollow inner member.

The inner and outer members each have intermediate the respective ends thereof a shear section. Upon overloading of the outer member and the shearing failure thereof, the inner member continues to twist until rupture at the inner member shear section. The twisting reduces the inner flow area of the inner member to zero, thereby preventing the continued flow of lubricant from the power transfer device through the inner member whereby loss of lubricant in the power transfer device as a consequence of coupling failure is prevented.

20 Claims, 3 Drawing Figures

LUBRICANT DELIVERING AND CONTAINMENT OVERLOAD SHEARABLE COUPLING

TECHNICAL FIELD

This invention relates to a lubricant delivering, oil containment, overload shearable coupling for use in interconnecting an engine driven gearbox to an aircraft fuel pump.

BACKGROUND ART

In aircraft, fuel pumps are conventionally driven in their operation by power taken from the aircraft engine and delivered through a gearbox to a mechanical coupling that in turn provides an input to the fuel pump. It has been found to be desirable in the arrangement just described that the mechanical coupling be provided with a means to lubricate the ends of the coupling that respectively engage the gearbox and the pump. The gearbox has a limited supply of lubricant contained therein, which lubricant is delivered under pressure to the various bearing components of the gearbox. Historically this supply of lubricant has been delivered to either end of the mechanical coupling that joins the gearbox and the pump by passages in the coupling that delivers lubricant from the gearbox to the pump. Return passages in the coupling are provided to allow the return of lubricant from the pump to the gearbox. In the event of a bearing failure in the pump or the ingestion of a foreign object into the pump, either of which can cause the pump to jam, the mechanical coupling experiences an overload and fails in torsional shear. This failure is rapidly followed by the loss of gearbox lubricant through the passages in the coupling which is in a state of rupture. The gearbox, absent lubricant fails next in what may result in a cascading, compounding series of failures of other aircraft components that depend upon continued gearbox integrity.

The invention to be described hereinafter completely solves the problem defined next above.

The problem of fluid loss from a fluid line where the fluid line is involved in a suddenly appearing destructive environment has been addressed in U.S. Pat. No. 3,963,055 issued to J. DeRosa. The DeRosa patent is directed to a self sealing fuel line wherein the fuel line is comprised of lengths of hard material having a relatively high tensile strength interrupted by rings of soft ductile material. When the fuel line is subjected to an impact or excessive forces sufficient to cause rupture, the ductile rings are first drawn to a relatively small diameter, pinching off an inner resilient seal tube to shut off further flow. The DeRosa patent offers no suggestion of a mechanical coupling wherein an inner lubrication tube is twisted to the point of rupture thereby reducing the inner diameter of the tube and preventing fluid loss from the ruptured tube, such as the invention to be discussed hereinafter provides.

DISCLOSURE OF THE INVENTION

This invention more specifically, relates to an improved lubricant delivering coupling adapted to interconnect a power transfer unit and a load having a rotary input. The coupling is comprised of a pair of concentrically disposed inner and outer hollow members. The outer member is in a torque transmitting relationship between the power transfer unit and the load. The inner hollow member is secured at both ends to an inner surface of the outer member and is adapted to receive lubricant from a lubricant source within the transfer device for delivery to and through the hollow inner member.

Each of the inner and outer members have intermediate the respective ends thereof a shear section. Upon overloading of the outer member and the shearing failure thereof, the inner member continues to twist until rupture at the inner member shear section. The twisting reduces the inner flow area of the inner member to zero, thereby preventing the continued flow of lubricant from the power transfer device through the inner member whereby loss of lubricant in the power transfer device as a consequence of coupling failure is minimized.

It is therefore a principal object of this invention to provide a lubricant delivering coupling that automatically causes lubricant flow through the coupling to cease in the presence of a torsinal shear failure of the coupling.

Another object of the invention is to provide a mechanical coupling with a torsionally deformable lubricant carrying inner tube that has a necked down shear section that will twist in a manner that will stop lubricant flow upon a torsionally induced failure of the coupling.

Yet another object of the invention is to provide a mechanical coupling that has sections that fail sequentially by providing a hollow outer torque transmitting member that has an inner hollow member secured therein made of a material that has a modulus of elasticity of which is significantly greater than the modulus of elasticity of the other member.

A final object of the invention is to provide a lubricant delivering coupling for joining a power driven gearbox to a pump. The coupling being provided with leak minimizing means, such that jamming of the pump with an attendant torsional failure of the coupling results in the leak minimizing means effectively reducing the loss of lubricant from the coupling to a negligible amount.

In the attainment of the foregoing objects, the invention contemplates a lubricant delivering and containment, overload shearable coupling which is comprised of a hollow shaft having a splined outer surface at both ends to allow the mechanical coupling of the shaft at one end to a rotary input from a gearbox and at the other end to a pump which represents a load to be driven.

The hollow shaft is provided with a shear section positioned between said hollow shaft ends. The shear section of the hollow shaft is established by providing a reduced outer diameter region of the hollow shaft at a point along an outer surface of the hollow shaft.

A lubrication tube is coaxially positioned within the hollow shaft and secured at both ends thereof to an inner surface of the hollow shaft. The lubrication tube is adapted at one end thereof to receive lubrication from a source of lubricant within the gearbox and to deliver the lubricant through the tube for lubrication use at the other end.

The lubrication tube is provided with a necked down section that has an oval cross-section in the necked down section to thereby provide a torsionally yieldable section that will yield in a twisting manner. The hollow shaft gear section in the preferred embodiment is concentrically positioned adjacent the lubrication tube necked down portion. The hollow shaft and the lubrication tube are made of different materials. The lubrication tube material is selected to have a modulus of elasticity significantly greater than the material of the hollow shaft. The material selection and necked down configuration allow for the aforementioned twisting to occur thereby preventing continued lubricant flow through the tube prior to tube rupture whenever the hollow shaft experiences a torsional load due to a pump malfunction and the load is sufficient to cause the shearing of the hollow shaft at the shear section.

Other objects and advantages of the present invention will be apparent upon reference to the accompanying description when taken in conjunction with the following drawings:

BRIEF DESCRIPTION OF DRAWINGS

FIG. 1a is a cross section taken along the line AA in FIG. 1, and FIG. 2. illustrates the preferred embodiment of the invention in a torsional failure mode.

BEST MODE FOR CARRYING OUT THE INVENTION

Figure 1:
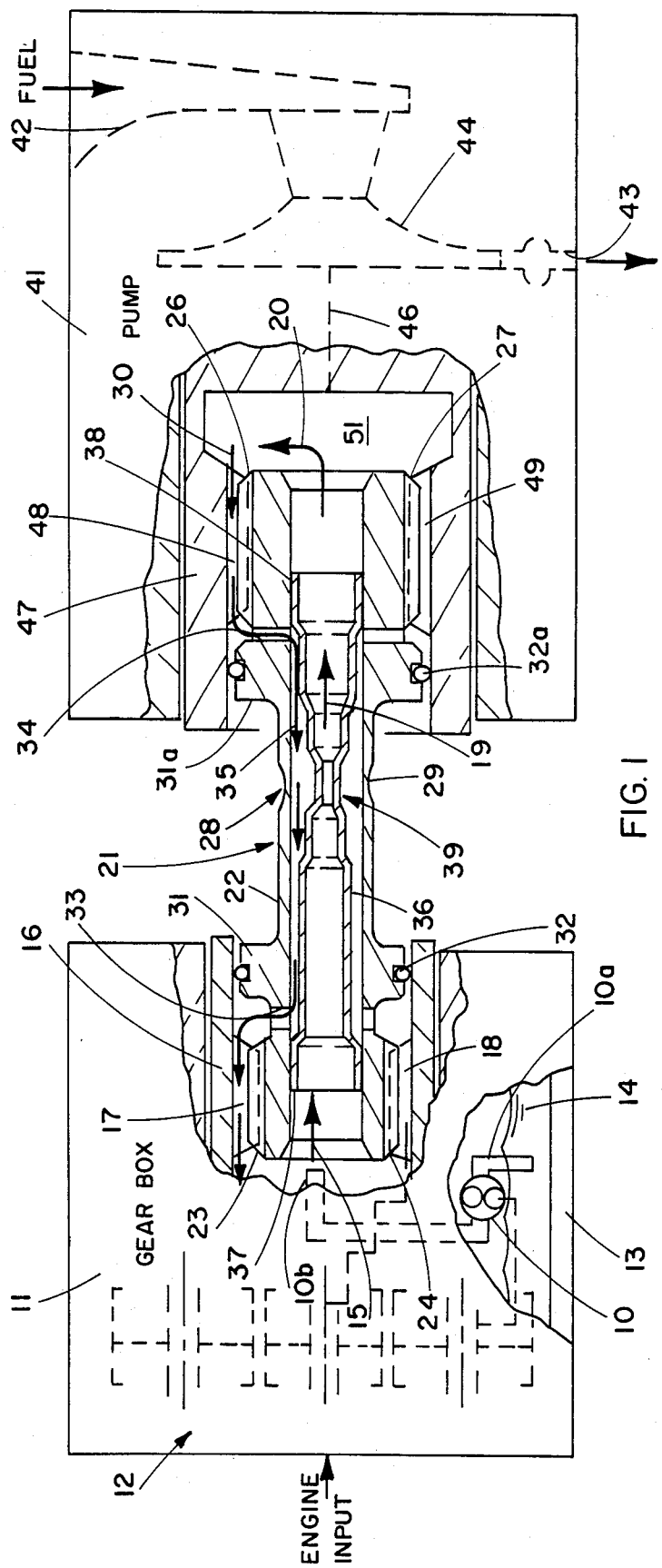
FIG. 1 is schematic in nature and illustrates the preferred form of the invention in a gearbox and pump environment.

Reference is now made to FIG. 1 in which figure there is shown in schematic form an engine driven gearbox 11 and a fuel pump 41 for use in an aircraft environment as outlined at the outset of the specification. The engine driven gearbox 11 and fuel pump 41, each contain elements shown in dotted outline as well as an open, partial section which illustrates the cooperative detail of the lubricant delivering, oil containment, overload shearable coupling embodying the invention. This coupling is indicated in general by reference numeral 21 and associated arrow. The details of the coupling 21 and its cooperation with the gearbox 11 and the fuel pump 41 will be explained in detail hereafter.

The gearbox 11 is shown receiving at its left-hand side an engine input. The gearbox 11 is a power transfer unit which acts to deliver power from an engine (not shown) to and through the coupling 21 to a load, here shown as fuel pump 41. Within the gearbox 11 there is shown in a broken line fashion reduction gearing 12 which mechanically couples the engine input to a hollow shaft having a hollow shaft end 16. A portion of the hollow end shaft 16 is depicted in the partial section. The hollow shaft end 16 is provided with internal splines, two of which 17 and 18 are referenced. At the bottom of the gearbox 11 the partial section reveals in cross section a gearbox housing wall 13 and a supply of lubricant 14. The volume of lubricant 14 is limited to the dimensions of the gearbox 11 and the maximum operating load of the lubricant brought about by design considerations which form no part of the instant invention. The lubricant 14 is circulated throughout the gearbox 11, in part by the gearing 12, as well as, pumping means 10 and conduits 10a, 10b as shown, to a point in the gearbox 11 indicated by lubricant flow arrow 15. The pump 10 constitutes a lubrication means which provides lubricant under pressure via hydraulic means i.e. conduits 10a, 10b to one end of the inner hollow tube member 36 as noted above by arrow 15.

The mechanical coupling 21 of the instant invention is comprised of a hollow shaft 22 which is illustrated in full section and depicts the presence of splined outer surfaces at both ends thereof, which splined outer surfaces are represented by external splines 23, 24 at the left-hand end and external splines 26, 27 at the right-hand end. The external splines 23, 24 of the hollow shaft 22 are shown in cooperative driving engagement with the internal splines 17, 18 of hollow shaft end 16.

The pump 41 is provided with a hollow shaft end 47 into which hollow shaft 22 and the splined surfaced end 26, 27 fits cooperatively and engages internal splines 48, 49 of the hollow shaft end 47. The physical cooperation of the splined ends of the hollow shaft 22 with the pump hollow shaft end 47 establishes, as shown, a lubrication cavity 51, the function of which will be explained more fully hereinafter. It should be noted that the specific details of the pump configuration are not critical to the invention here being described. It is believed that a sufficient disclosure of the pump components is present as shown in dotted outline to facilitate an understanding of the invention. These components are a mechanical connection 46 from hollow shaft end 47 to an impeller 44 which receives fuel through inlet 42 and delivers fuel under pressure to outlet 43.

Returning now to the details of construction of the coupling 21 which embodies the invention.

Given the description of the coupling's hollow shaft 22 and its cooperation with the gearbox 11 hollow shaft end 16 and pump 41 hollow shaft end 47, it should be evident that power is delivered from an engine input through the gearbox 11 and the hollow shaft 22 of coupling 21 to the fuel pump 41 to drive the impeller 44 and pump the fuel.

As noted earlier it has been found desirable to provide lubrication to both ends of a coupling employed to interconnect the gearbox to the pump. To this end there is provided, as shown in FIG. 1, a concentrically mounted inner hollow member in the form of a tube 36. The inner hollow tubular member 36 is shown enlarged at both ends and is secured to an inner surface of the outer hollow member 22 at points 37 and 38. The inner member 36 may be secured to the outer hollow member by such means as brazing, welding, soldering, adhesives, or interference fit. The preferred method of securing the inner member 36 to the outer member 22 is by soldering.

Attention is now directed to that portion of the coupling shown in FIG. 1 disposed between the gearbox 11 and the pump 41. There is shown at a point between the ends of the hollow outer shaft 22 a region identified by reference numeral 28, which region is referred to as a shear section. This shear section 28 is brought into existence by the presence of what is shown as a reduced outer diameter point 29 of the hollow shaft 22. The shear section 28 is provided in order that the appearance of an excessive load on the hollow shaft 22 results in the rupture or failure at the precise point in the region defined by the reduced outer diameter or notched point 29 on the hollow shaft 22. The nature of the material selected for use in fabricating the inner tubular member 36 is critical to the invention and will be described in detail hereafter.

It will be observed that the tubular lubricant inner member 36 has what is described as a necked down oval shear section 39 of the configuration shown in FIG. 1a. In the preferred embodiment, the shear section 39 is concentrically positioned with respect to shear section 28 of the outer hollow member 22.

The oval cross section of the necked down portion 39 can be formed by placing the tubular lubricant inner member 36 in a die that has an internal form that will cause the circular cross-sectional tubular member to take on the necked down, oval cross-sectional configuration as seen in FIG. 1a. This oval cross section of the necked down portion is significant to obtaining the ultimately desired twisting closure of the inner tubular member prior to shear.

Lubrication of coupling 21 and the cooperating pair of splines 17, 18 and 23, 24 as well as spline pair 48, 49 and 26, 27 will now be described.

It will be recalled that lubricant is delivered as indicated earlier and as shown by lubricant flow arrow 15 into the left-hand end of hollow shaft 22, whereafter it enters the inner hollow tubular member 36 and passes through the necked down portion as indicated by lubricant flow arrow 19. Lubricant flow arrows 20, 30, and 35, respectively show lubricant entering cavity 51 and passing therefrom through the interface of splines 26, 48 and thence through port 34 in the outer hollow shaft 22. From the foregoing description it should be apparent that lubricant is delivered through the coupling 21 and its inner tubular member 36 to cavity 51 whereupon the lubricant is forced back through the end splined connections, lubricating the same, and thereafter between the hollow shaft 22 and the hollow shaft end 47. The lubricant then passes back towards the left-hand end of the coupling in the space defined between the outer hollow shaft 22 and the inner tubular member 36. It will be observed that a port 33 in the hollow shaft 22 at the left-hand thereof permits the lubricant to pass up and then through the spline interface of splines 17 and 23 thereby lubricating the left-hand end of the coupling 21 and its connection with the gearbox. The hollow shaft 22 is provided with a pair of radial support shoulders, 31, 31(a), as shown, that are provided respectively with "o" rings 32, 32(a) which cooperate with the gearbox 11 and fuel pump 41 to prevent lubricant in normal useage from escaping from the gearbox 11 or pump 41.

Figure 2:
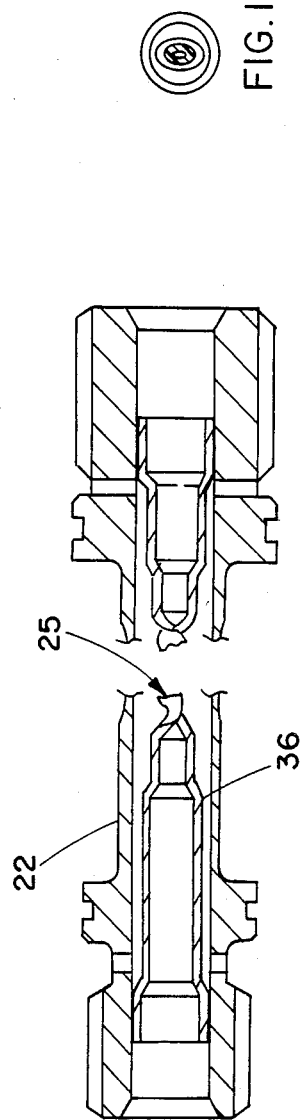

Critical to the operation of the invention is the selection of the material of which the inner tubular member is fabricated. This material must have a modulus of rupture in torsion such that when the outer hollow shaft experiences a torsional load sufficient to rupture, the inner tubular member must not rupture until the torsional load delivered to the inner tubular member has twisted the inner tubular member into the ruptured configuration 25 as shown in FIG. 2. The twisted ruptured configuration 25 is such that virtually no lubricant can escape from the inner tubular member 36 and the loss of lubricant from the gearbox 11 via the tubular member 36 is prevented. There may be some small loss of lubricant that is present in the region between the hollow shaft 22 and the inner tubular member 36. It should also be readily appreciated that rapidly rotating hollow shaft 22 and the lubricant passage port 33, with whatever lubricant is present after rupture inherently experience the presence of a centrifugal need present in the lubricant at the port 33. Any lubricant that might find its way into the region of port 33 must overcome the inherent centrifugal head, just noted, before it can escape from between hollow shaft 22 and tubular member 36. The aforementioned centrifugal head coupled with the lubricant 14 being at a level below the coupling 21 results in minimal lubricant loss through the port 33.

In the preferred embodiment when the hollow shaft was made from high alloy steel. The inner tube material can be any one of the following metals: aluminum, stainless steel, or copper, with copper being the preferred. It is, of course, recognized that the invention contemplates that materials other than metal, such as plastic, could also satisfy the requirements of the invention.

In FIG. 1 and FIG. 2 the hollow member 22 and the inner tubular member each have circular cross sections except the shear section of the inner member which has an oval cross section as noted earlier. The invention however is not limited in respect of the cross section of either of these components. Accordingly, torque tubes, for examples of square or triangular cross sectional shapes or any variation of a polygon might well find utility in practicing the invention as long as the relationship of the modulus of rupture between the two is as described hereinbefore.

Although this invention has been illustrated and described in connection with the particular embodiment illustrated, it will be apparent to those skilled in the art that various changes may be made therein without departing from the spirit and scope of the invention as set forth in the appended claims:

I claim:

1. An improved lubricant delivering coupling adapted to interconnect a power transfer means and a load having a rotary input, said coupling comprising a pair of concentrically disposed inner and outer hollow members wherein said outer member is in a torque transmitting relationship between said power transfer means and said load and said inner hollow member is secured at both ends to said outer hollow member and adapted to receive lubicant from a lubricant source within said power transfer means for delivery to and through said inner hollow member, said inner and outer hollow members each having intermediate the respective ends thereof a shear section such that upon the overloading of said outer member and the shearing failure thereof, said inner member continues to rotate such that said inner member shear section twists closed and ruptures to thereby prevent the continued flow of lubricant from said power transfer means through said inner hollow member whereby loss of lubricant in said power transfer means via said inner hollow member as a consequence of coupling failure is prevented.

2. The improved coupling of claim 1 wherein said inner member is secured to an inner surface of said outer member.

3. The improved coupling of claim 2 wherein said outer member shear section is concentrically positioned adjacent said inner member shear section.

4. The improved coupling of claim 3 wherein said outer member has a circular cross-section and said shear section is established by providing a reduced outer diameter region of said outer member at a point along an outer surface of said outer member.

5. The improved coupling of claim 4 wherein said inner member has a circular cross-section and said inner member shear section has a necked down configuration.

6. The improved coupling of claim 5 wherein said inner member necked down shear section has an oval configuration.

7. The improved coupling of claim 6 wherein said inner and outer member are made of different materials with said inner member material having a modulus of elasticity in torsion signficantly greater than the material of said outer member.

8. The improved coupling of claim 7 wherein said outer member is provided at opposite ends with spline means mechanically coupled to said powder transfer means at one end and at the opposite end mechanically coupled to said load to transmit torque from said power transfer means through said outer member to said load.

9. The improved coupling of claim 8 wherein said power transfer means is a gearbox.

10. The improved coupling of claim 9 wherein said load is a pump having a rotating impeller, said pump susceptible of malfunctioning such that said pump impeller cannot rotate, thereby overloading said outer member and causing the same to fail in shear at said shear section.

11. A lubricant delivering and containment overload shearable coupling comprising
- a hollow shaft having mechanical means at both ends thereof to respectively mechanically couple said shaft at one end to a rotary input and at the other end to a load to be driven,
- said hollow shaft having a shear section positioned between said hollow shaft ends,
- a lubrication tube coaxially positioned within said hollow shaft and secured at both ends thereof to said hollow shaft,
- said lubrication tube receiving lubricant at one end for delivery through said lubrication tube, and
- said lubrication tube having a necked down section which provides a torsionally yieldable shear section that yields in a twisting manner upon the overloading of said hollow shaft and subsequent shearing failure thereof, said necked down section twisting closed prior to rupture to prevent lubricant flow through said lubrication tube.

12. The coupling of claim 11 wherein said necked down section of the lubrication tube has an oval cross section.

13. The coupling of claim 12 wherein said lubrication tube is secured to an inner surface of said hollow shaft.

14. The coupling of claim 13 wherein said hollow shaft shear section is established by providing a reduced outer diameter region of said hollow shaft at a point along an outer surface of said shaft.

15. The coupling of claim 14 wherein said hollow shaft shear section is concentrically positioned adjacent said lubrication tube necked down portion.

16. The coupling of claim 15 wherein said mechanical means at both ends of said hollow shaft are torque transmitting splines.

17. The coupling of claim 16 wherein said hollow shaft and said lubrication tube are made of different materials with said lubrication tube material having a modulus of elasticity in torsion significantly greater than the material of said hollow shaft.

18. The coupling of claim 16 wherein said rotary input is delivered via a power transfer means coupled to one of said splines,
- said power transfer means having a lubrication means providing lubricant under pressure via hydraulic means to said lubrication tube at said one end of said tube.

19. The coupling of claim 18 wherein said power transfer means is a gearbox.

20. The coupling of claim 18 wherein said load coupled to said other end of said hollow shaft is a fluid pump having a rotating impeller, said fluid pump susceptible of malfunctioning such that said pump impeller cannot rotate thereby overloading said hollow shaft and causing the same to shear at said shear section.

* * * * *